Figure 1:
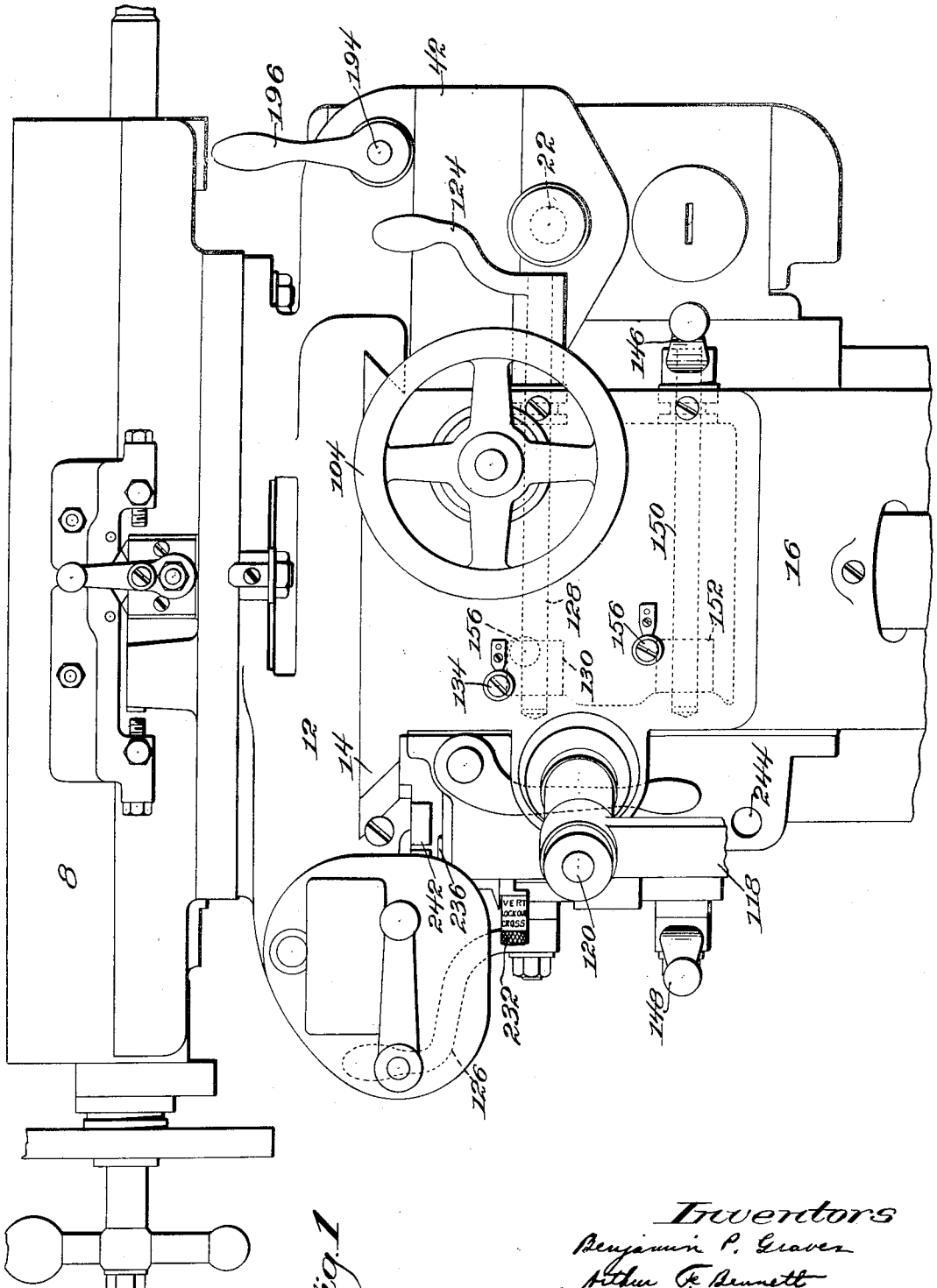

March 13, 1934.  B. P. GRAVES ET AL  1,951,146
TRANSMISSION MECHANISM FOR MACHINE TOOLS
Filed April 5, 1927   6 Sheets-Sheet 1

Witness
Jas J. Maloney

Inventors
Benjamin P. Graves
Arthur F. Bennett
by Van Everen Fish
Hildreth Hary Attys.

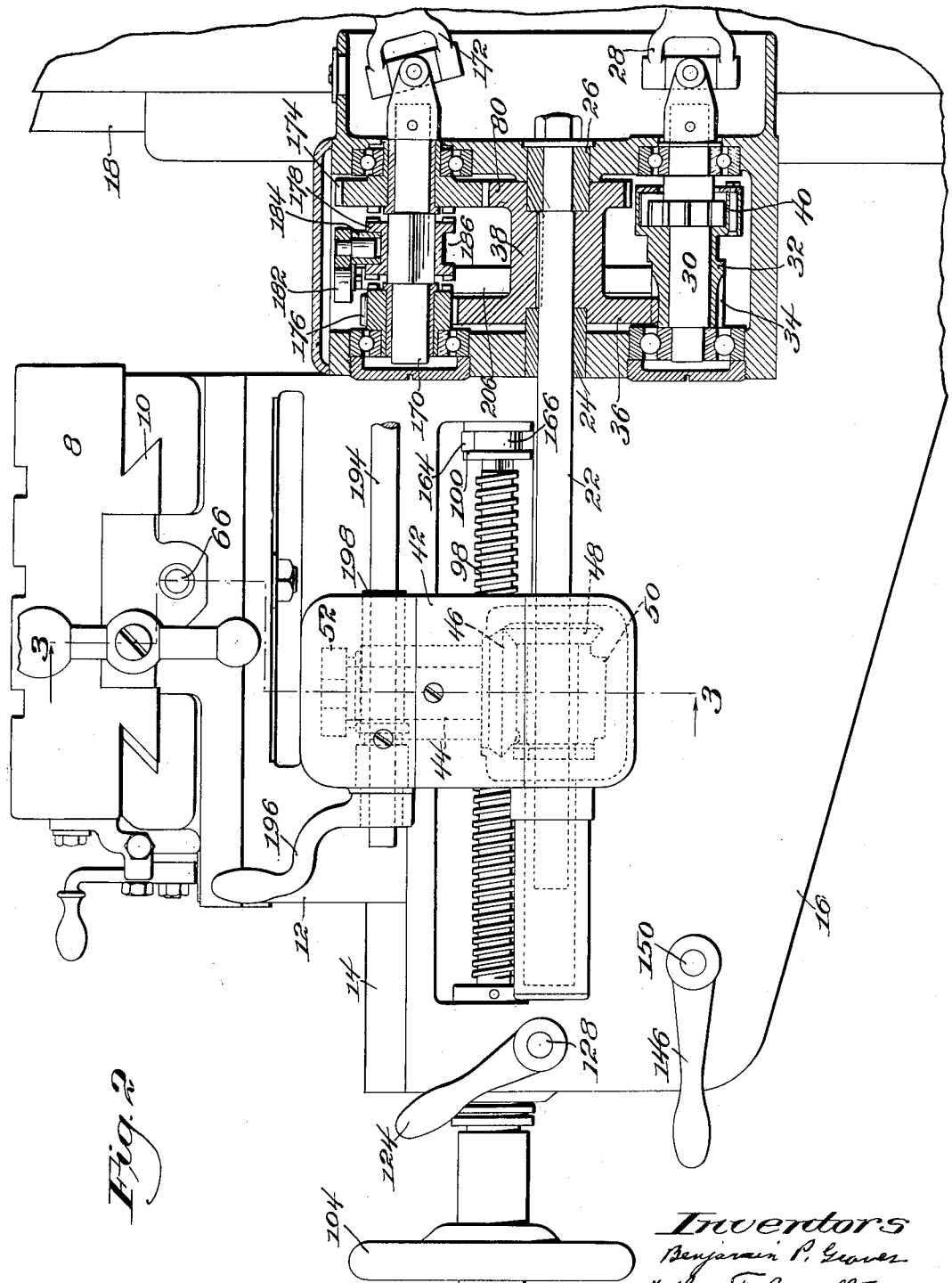

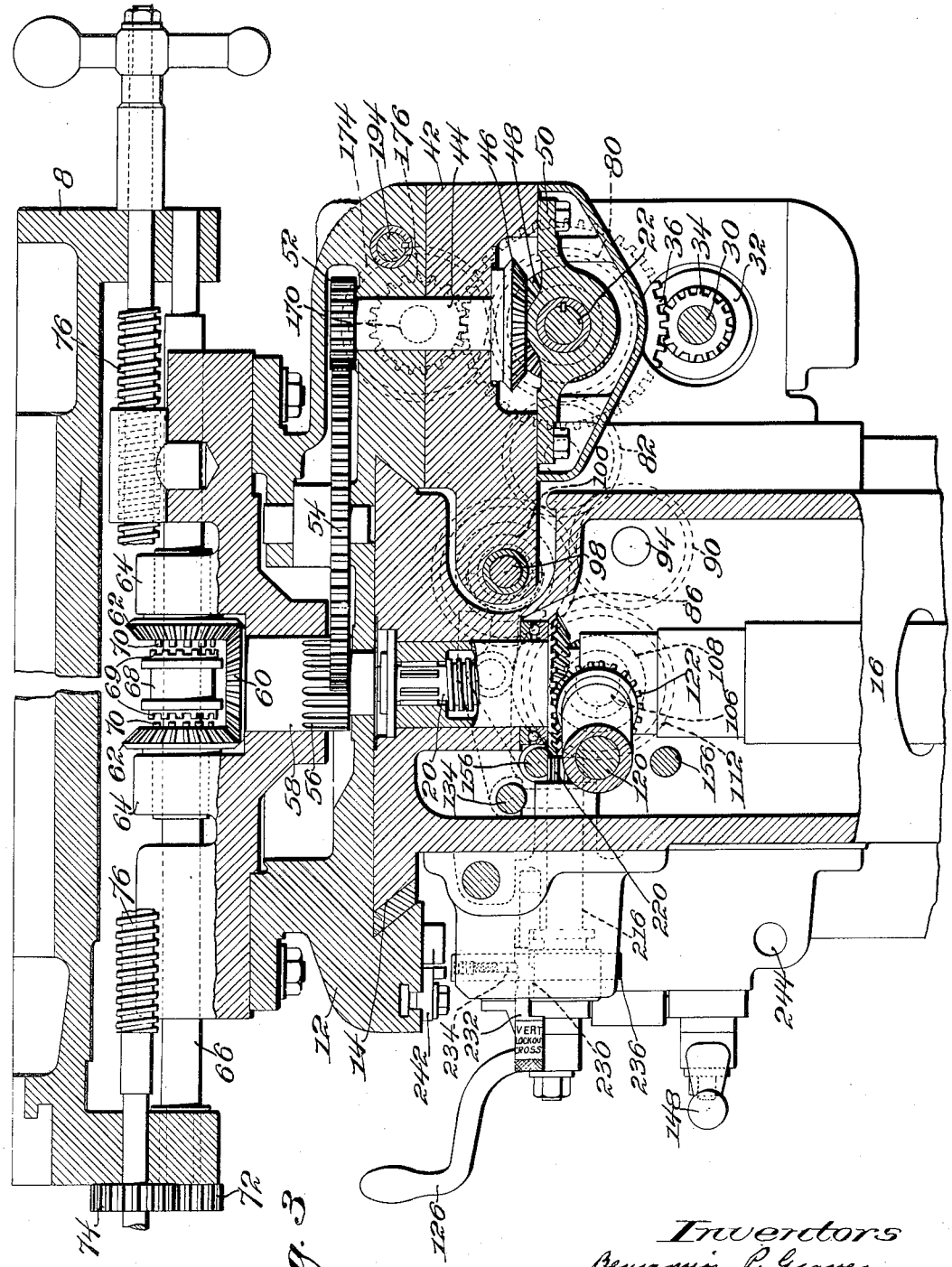

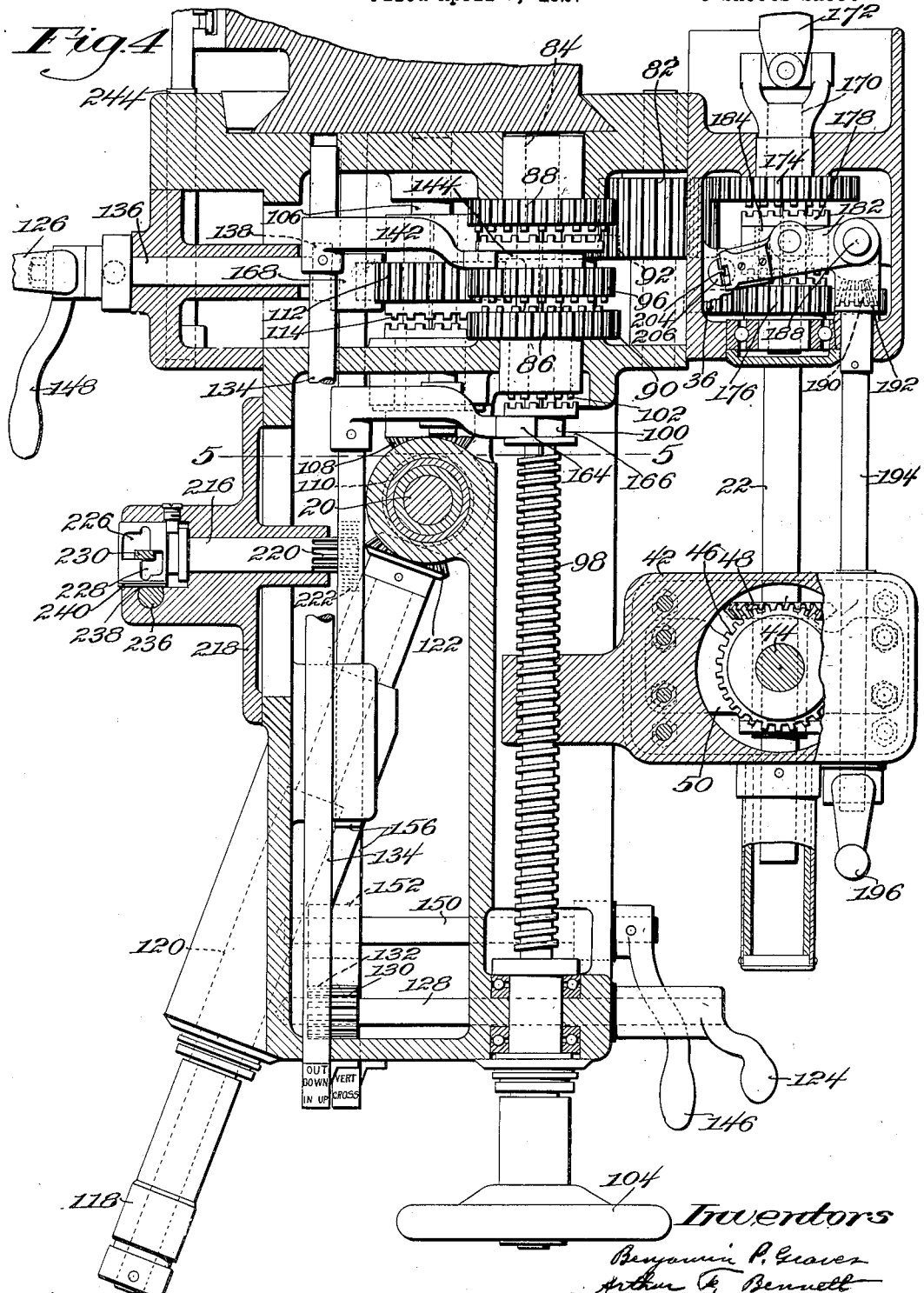

March 13, 1934.  B. P. GRAVES ET AL  1,951,146
TRANSMISSION MECHANISM FOR MACHINE TOOLS
Filed April 5, 1927    6 Sheets-Sheet 5
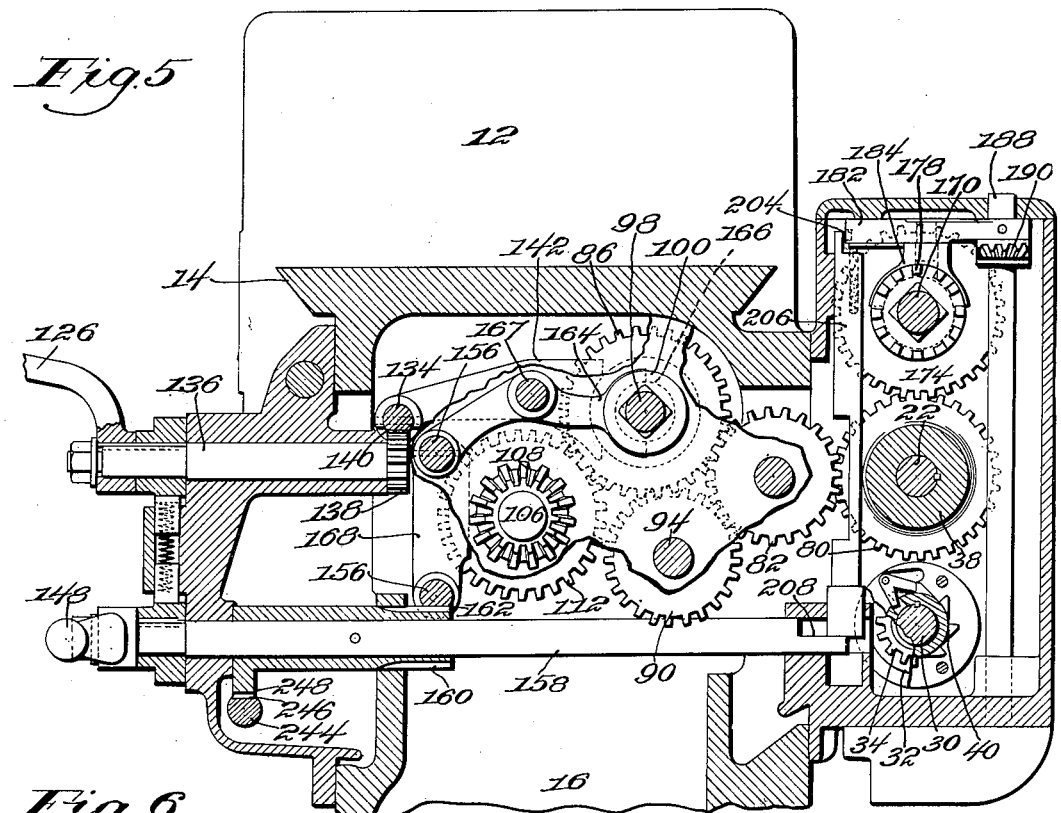
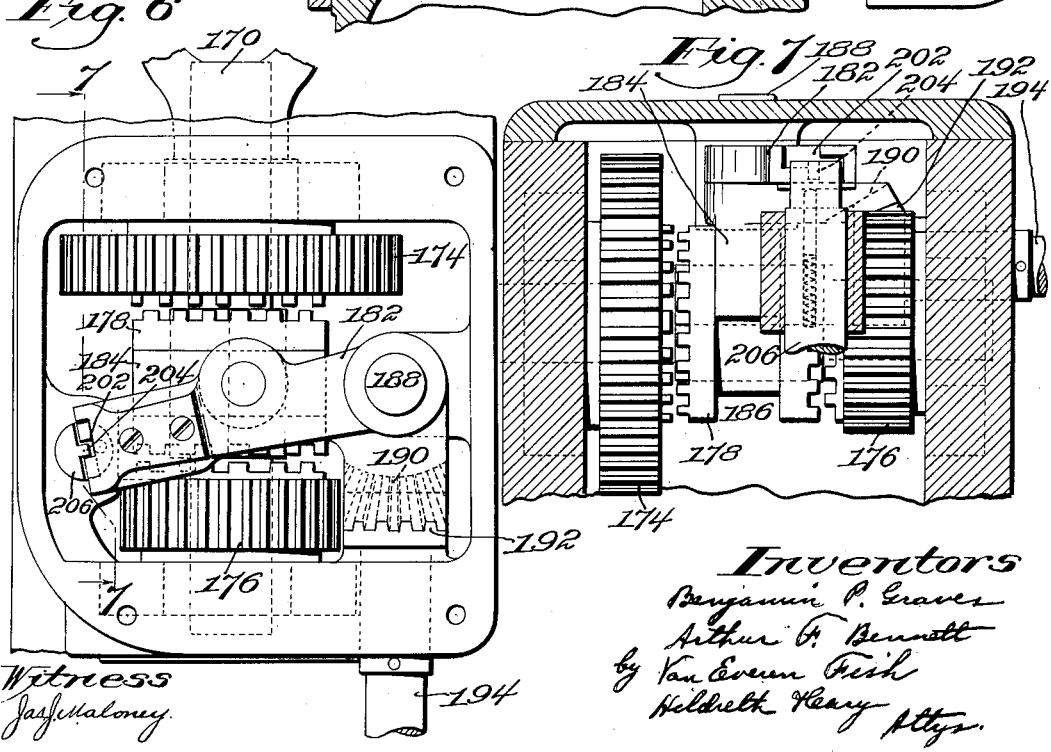

March 13, 1934.  B. P. GRAVES ET AL  1,951,146
TRANSMISSION MECHANISM FOR MACHINE TOOLS
Filed April 5, 1927  6 Sheets-Sheet 6
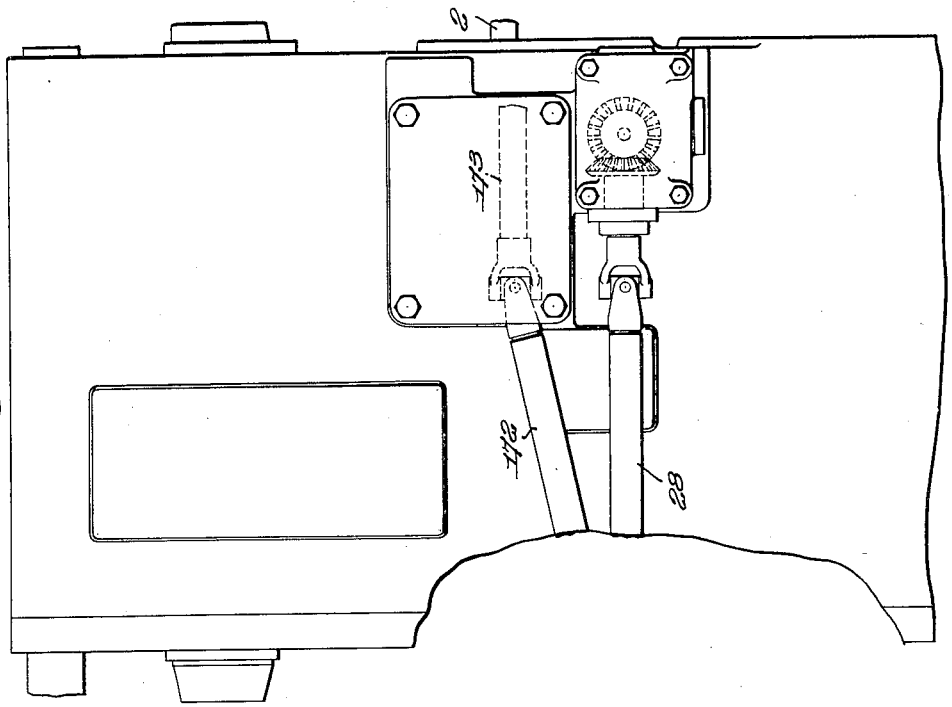
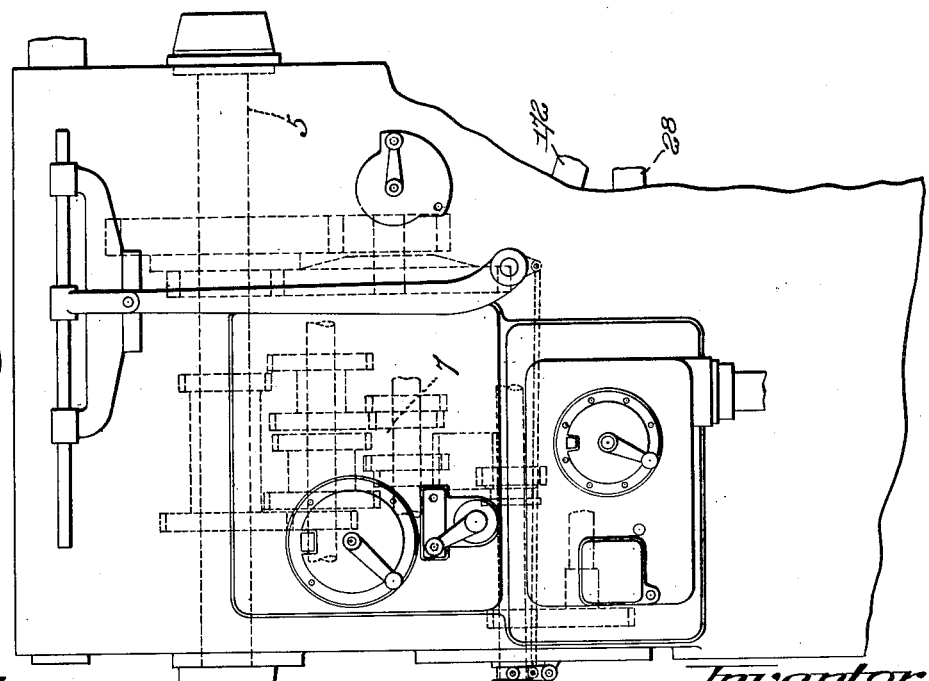

Patented Mar. 13, 1934

1,951,146

UNITED STATES PATENT OFFICE

1,951,146

TRANSMISSION MECHANISM FOR MACHINE TOOLS

Benjamin P. Graves, Cranston, and Arthur F. Bennett, West Barrington, R. I., assignors to Brown and Sharpe Manufacturing Company, a corporation of Rhode Island Application April 5, 1927, Serial No. 181,050

18 Claims. (Cl. 90—21)

The invention relates to transmission mechanisms for machine tools and is herein disclosed as embodied in a milling machine of the type which comprises a tool carrying arbor and a work table mounted to reciprocate on a saddle which is in turn adapted for movement transversely of the table feed on a vertically adjustable knee.

The object of the invention is to provide a simple and efficient transmission mechanism which will be particularly adapted for use in a milling machine of this description.

With this object in view the several features of the invention consist in the devices, combinations and arrangement of parts hereinafter described and claimed.

The features of the invention and the advantages to be gained thereby will be readily understood by one skilled in the art from the following description taken in connection with the drawings, in which Fig. 1 is a view in front elevation of the work supporting portion, including the table, saddle and knee, of a milling machine illustrating the preferred embodiment of the present invention; Fig. 2 is a view in side elevation of the portion of the machine illustrated in Fig. 1 with certain parts broken away to show the connections of the variable speed drive and the quick traverse with the main feeding shaft; Fig. 3 is a view partly in section taken substantially on the line 3—3 of Fig. 2; Fig. 4 is a plan view illustrating particularly the feeding and reversing mechanism for the saddle and knee; Fig. 5 is a view partly in section taken substantially on the line 5—5 of Fig. 4; Fig. 6 is a detail plan view illustrating particularly the two speed clutch and the lock for the quick traverse mechanism; Fig. 7 is a view taken on the line 7—7 of Fig. 6; and Figs. 8 and 9 are left-hand and right-hand side elevations of the column of the machine.

In carrying out the invention transmission mechanism is provided for actuating the table, saddle and knee which comprises a main feeding shaft and intermediate trains of gearing, the main feeding shaft being in turn driven from the main driving shaft 2 of the machine through change speed gearing, such as that described in the patent to Graves No. 1,480,900, dated January 15, 1924. The table is driven from the main feeding shaft through a train of mechanism which includes a neutral and reversing clutch so that the table may be driven in either direction or permitted to remain stationary as desired. The saddle and knee are driven from the main feeding shaft through another reversing mechanism which is adapted to control the direction of movement of both of these elements. Two secondary clutches included in the trains of mechanism leading from the reversing clutch to the saddle and the knee respectively, permit the saddle and knee to be disconnected from the driving mechanism, and these secondary clutches are connected together in such a way that only one of these elements may be in operation at a time. Thus confusion is avoided and the operation as well as the construction of the machine is much simplified.

In order to bring the work support more rapidly into operating position than is possible with the relatively slow movements transmitted through the variable speed driving mechanism above referred to, a quick traverse mechanism is provided which is adapted to drive the main feeding shaft at a faster rate. It is desirable to give the table feed a more rapid quick traversing movement than the mechanisms for adjusting the saddle and knee. For this purpose, the quick traverse mechanism is provided with a two speed clutch adapted to drive the feeding shaft at either of two relatively rapid rates, the higher speed being adapted for use with the table feed and the relatively low speed for the saddle and knee.

To prevent injury to the machine at the hands of an unskilled or careless operator and to insure its most efficient operation at all times, a lock is provided which acts automatically to prevent the high speed quick traverse from being thrown in when the main feeding shaft is operatively connected to the saddle or knee. Also, a safety latch is provided for the assistance of the operator in the manipulation of the secondary clutches. One setting of the latch will cause both clutches to be locked in neutral position. Another setting of the latch will permit only the cross feed to be thrown in and a third setting allows only the knee or vertical feed to be operatively connected with the main driving shaft.

Referring more specifically to the drawings, the work supporting portion of the machine comprises a table 8 mounted to reciprocate on slides 10 on the saddle 12 which is mounted on guideways 14 on the knee 16 for movement transversely of the table feed. The knee 16 is mounted for vertical movement on guideways 18 formed on the machine column and is supported adjustably in position by the telescopic screw 20.

Movement is transmitted to the table, saddle and knee through separate trains of mechanism from a main feed shaft 22 mounted to turn in bearings 24 and 26 formed in the knee portion 16 of the work support. The main feed shaft 22 is driven from the usual variable speed mechanism mounted in the machine column through the shaft 28 which is connected by means of a universal joint with a short shaft 30 journaled in the knee portion 16. On the shaft 30 is loosely mounted a sleeve 32 carrying a gear 34 which meshes with a gear 36 formed on a sleeve 38 splined to the main feed shaft 22. The sleeve 32 is driven from the shaft 30 through an overrunning clutch 40 of well known construction, so that the main feed shaft may be driven ahead of the relatively slow moving change speed gearing.

The mechanism for driving the table from the main feed shaft is supported on the saddle and comprises a casing 42 secured thereto which is adapted to receive the end of the shaft 22. Within the casing is mounted the vertical shaft 44 which carries at its lower end a bevel gear 46 adapted to engage with a gear 48 which is sleeved to turn with the shaft 22 and is movable lengthwise of the shaft with the saddle 12. A bracket 50 mounted on the casing 42 engages with the hub of the gear 48 to hold it at all times in mesh with the corresponding gear 46. At the upper end of the shaft 44 is mounted a gear 52 engaging an idle gear 54 which in turn engages a gear 56 formed on a vertical shaft 58. The table is driven from the vertical shaft 58 through a neutral and reversing clutch which comprises a bevel gear 60 mounted on the upper end of the shaft 58 and the oppositely situated gears 62 engaging therewith which are mounted in bearings 64 on the saddle and sleeved concentrically with the shaft 66 mounted in the table. A sleeve 68 splined on the shaft 66 is provided at either end with clutch teeth 69 adapted to move into engagement with corresponding teeth 70 on the gears 62 so that the shaft 66 may be driven in either direction by the engagement with one or the other of gears 62 or permitted to remain idle. The shaft 66 is in turn connected by gears 72 and 74 to the table feeding screw 76.

Movement is imparted to the saddle and knee from the main feeding shaft 22 through connections which include a reversing clutch for driving both the saddle and knee and two secondary clutches for disconnecting each of these elements separately from its driving means. The sleeve 38 splined to turn with the main feed shaft 22 carries a gear 80 which is held permanently in engagement with an idle gear 82. The shaft 84 also journaled in the knee portion of the work support is driven in opposite directions from the gear 82 by means of a reversing mechanism which comprises the gears 86 and 88 loosely sleeved to the shaft 84, the gear 88 meshing directly with the gear 82 and the gear 86 being connected indirectly through the intermediate gears 90 and 92 secured to the stub shaft 94 so that these gears 86 and 88 are driven continuously in opposite directions from the main feed shaft 22. A sleeve gear 96 is keyed to rotate with the shaft 84 between the gears 86 and 88 and is provided at each end with clutch teeth adapted to engage corresponding teeth formed on the gears 86 and 88 so that by engagement with one or the other of these gears the sleeve gear 96 and also the shaft 84 may be driven in opposite directions or, by the neutral position of the sleeve gear 96, may be rendered inoperative.

The feeding screw 98 for the saddle is mounted on the knee in axial alignment with and abutting the end of the shaft 84. It is operatively connected to the shaft 84 by means of a secondary clutch which comprises a sleeve 100 keyed to slide axially along the feeding screw. The sleeve is provided with clutch teeth 102 adapted to engage corresponding teeth formed on the end of the shaft 84. The saddle traversing mechanism may be operated manually by means of a wheel 104 mounted on the forward end of the saddle feed screw 98.

The knee is raised or lowered automatically from the reversing clutch above described through a secondary clutch and connections which include the shaft 106 journaled horizontally in the knee and provided at one end with a bevel gear 108 adapted to engage with a corresponding bevel sleeve gear 110 secured to the telescopic screw 20 for raising and lowering the knee. Loosely sleeved on the shaft 106 is a gear 112 which is held permanently in engagement with the gear 96 on the shaft 84 so that the gear 112 will be driven in either direction or will remain stationary according to the position of the gear 96. Clutch teeth 114 are formed on one face of the gear 112 and are adapted to engage with corresponding teeth formed on an enlarged portion of the shaft 106 to drive the shaft from the reversing mechanism as above described. The knee may be raised or lowered manually by means of a lever 118 mounted on the forward end of a shaft 120 which is provided at its rear end with a beveled gear 122 adapted to engage with the sleeve gear 110 on the telescopic screw 20.

The reversing mechanism may be controlled by the operator either from the front or from the side of the machine by means of levers indicated at 124 and 126. The lever 124 is mounted on a rock shaft 128 which carries also a pinion 130 adapted to engage with a rack 132 on the bar 134, and the lever 126 at the side of the machine is secured to a rock shaft 136 which has secured thereto a pinion 138 engaging a rack 140 on the bar 134 so that the bar 134 may be moved forward or back by turning either lever. The sleeve gear 96 is moved with the rod 134 into engagement with gears 86 and 88 by means of a yoke 142 secured to the rod 134 and adapted to ride in a groove 144 formed in the hub of the sleeve gear 96.

The secondary clutches for the saddle and knee feeds are controlled together by means of a lever 146 mounted on the front of the machine or from the side of the machine by a lever 148 in such a manner that only one of these mechanisms will be in operation at a time. The lever 146 is secured to one end of a rock shaft 150 which carries a pinion 152 adapted to mesh with a rack formed on one of the two parallel and rigidly interconnected control bars 156 and the lever 148 is secured to a rock shaft 158 which carries a pinion 160 adapted to mesh with a rack 162 on the lower control bar 156 so that the rotation of either lever will cause the parallel bars 156 to move towards or away from the front of the machine. The clutch member 100 for the saddle feed is connected to move with the control bars by a yoke 164 secured to the upper bar and adapted to engage in a groove 166 formed in the clutch member 100. The clutch member or gear 112 for the vertical knee feed is similarly controlled by means of a yoke 168 secured to the two control bars 156 and flanged to engage either side of the gear 112. A third bar 167 secured to the machine frame acts as an additional guide and support for the yoke 164. When the control bars 156 are moved forward for one direction of rotation of the levers 146 and 148 from neutral position the knee feeding mechanism will be thrown into operation, and when the control bars 156 are moved back the saddle feed will be thrown in.

The forward ends of the control bar 134 and the lower bar 156 for the reversing mechanism and secondary clutches extend through the knee casing and are marked in such a manner as to indicate the positions of the controls for the saddle and knee mechanisms. For the forward position of the control bars 156 the vertical feed will be in operation, and for the retracted position of the bars the cross feed will be thrown in. With the control bars in an intermediate position both clutches are in neutral. Similarly for the forward position of the control bar 134 the reversing mechanism will be set to move the saddle outwardly or knee down as the case may be, and for the retracted position of the control bar 134, the saddle will be moved inwardly or the knee up, according to the position of the control bars 156.

A quick traverse mechanism is provided for the table, saddle and knee actuating mechanisms and is adapted through a two speed clutch to drive the main feed shaft 22 at either of two relatively rapid rates; at the higher speed when the main feed shaft is connected to the table traversing mechanism, and at a relatively slow speed when the feed shaft is connected to the saddle or knee actuating mechanisms. The quick traverse mechanism comprises a shaft 170 journaled in the knee casing directly above the main feeding shaft 22 and driven continuously at a relatively high speed from the main driving shaft 2 on the machine column through a shaft 172, and an intermediate shaft 173 geared to the main shaft.

As in the machine of the Graves patent, above referred to, the main shaft 2 is driven through a clutch from the power pulley or member 5, and drives the spindle through a set of change speed gears or rate changer 7.

Two gears 174 and 176 are loosely sleeved on the shaft 170 and mesh respectively with the gears 80 and 36 on the main feed shaft 22. Between the gears 174 and 176 is a clutch member 178 keyed to turn with and slide on the shaft 170 and provided at each end with clutch teeth adapted to engage corresponding teeth formed on the gears 174 and 176. During the ordinary operation of the machine the main feed shaft is driven through the shaft 30 and the change speed gearing at relatively slow speeds, and the clutch member 178 occupying the neutral position shown in Fig. 2 will turn with the shaft 170 at a relatively rapid rate as compared with the adjacent gears 174 and 176. When a quick traversing movement is desired the clutch member 178 is moved into engagement with one of the gears 174 and 176 bringing the gear up to the speed of the shaft 170 and causing the main feeding shaft 22 to run ahead of the change speed mechanism. The ratio of the size of the gears is such that the main feed shaft will be driven at the faster rate when the clutch member 178 is in its rear position in mesh with the gear 174.

The mechanism for controlling the position of the quick traverse clutch member 178 comprises a lever 182 to which is pivotally secured the yoke 184 adapted to ride in a groove 186 formed in the periphery of the clutch member. The lever 182 is secured to the upper end of a vertical pivot shaft 188 and is provided with a forwardly projecting arm carrying a gear segment 190 adapted to engage with a pinion 192 secured to a horizontal rock shaft 194. The operating lever for the quick traverse mechanism is mounted on the front of the machine and consists of a hand lever 196 secured to a sleeve 198 which is keyed to turn with the rock shaft 194 and is journaled in the casing 42 on the saddle.

A locking device is provided to insure the proper setting of the controlling levers by the operator so that the high speed quick traverse will be operatively connected only with the table feed, the relatively slow quick traverse being available for the saddle and knee. For this purpose a zigzag cam slot 202 is formed on the free end of the lever 182 to receive a lug 204 on the vertical rod 206. In the lower position of the rod 206 and the lug 204 the lever 182 will be permitted to swing only towards the rear to engage the clutch member 178 with the high speed quick traverse. In the raised position of the rod 206 and lug 204 the lever 182 is free to swing only towards the front to engage the clutch with the relatively slow speed quick traverse. The rod 206 rests at its lower end upon a flattened portion 208 of the rod 158 which forms a portion of the controlling mechanism for the secondary clutches for the saddle and knee. When the secondary clutches are in neutral position, the portion 208 of the bar 158 will be in a horizontal plane permitting the rod 206 to assume its lowest position. The lever 182 is now permitted to swing towards the rear to throw into operation the high speed quick traverse, at the same time locking the rod 206 against upward movement. The shaft 158 is thus prevented from turning and the secondary clutches are consequently locked in neutral position until the high speed quick traverse is disconnected.

When either of the levers 146 or 148 are turned to throw in the saddle or knee feeding mechanism, the rotation of the bar 158 will cause the rod 206 riding on the portion 208 of the bar to assume a raised position. The lug 204 now occupies a position in the cam slot 202 to permit the engagement of the clutch with the relatively low speed quick traverse while locking the lever 182 against movement in a direction to engage the high speed quick traverse.

A safety latch is provided for the assistance of the operator in the manipulation of the secondary clutches. The latch may be set to lock either the vertical or cross feed out of operation while permitting the other to be thrown in, or may be set to lock both clutches in neutral position during the operation of the table feed. The construction of the latch further insures the return of the manipulating lever exactly to neutral position at the end of a feeding operation by contact with a positive stop at this point. A shaft 216 is journaled in a bracket 218 on the side of the knee and carries at its inner end a pinion 220 which engages a rack 222 formed on the upper control bar 156 of the secondary clutches for the saddle and knee. The enlarged outer end of the shaft 216 has two recesses 226 and 228 adapted to receive a lug 230 formed on the latch pin 232 which may be moved in or out to adjust the position of the lug 230 with relation to the recesses 226 and 228. With the latch pin 232 in its middle position the lug 230 will engage in a narrow passage between the recesses 226 and 228 holding the saddle and knee clutches locked in neutral position. When the pin is pushed in to its full extent the lug 230 will be in alignment with the recess 228 to permit the cross feed to be thrown into operation and when the pin is drawn out to its limit the lug will coincide with the slot 226 to permit the vertical feed to be thrown in. A spring pressed plunger 234 adapted to engage in one of three notches corresponding to the three positions of the pin 232 holds the pin and the lug 230 yieldingly in adjusted position.

Automatic devices are provided for throwing the secondary clutches for the saddle and knee feeds out of operation when these mechanisms have been operated to designated limits of travel in each direction. For disconnecting the cross or saddle feed a rod 236 is mounted to slide vertically on the knee and carries a rack 238 which engages a gear segment 240 formed on the shaft 216. When the control bars 156 are retracted to engage the secondary clutch 100 for the saddle feed the rotation of the shaft 216 will raise the bar 236 into the path of the stop cams 242 mounted on the saddle. These cams are positioned to engage and force down the rod 236 as the saddle reaches the limit of its travel across the knee and thus advance the control bars 156 to return the clutch for the saddle feed to neutral position. The mechanism for automatically throwing out the secondary clutch for the vertical feed at the limits of its travel consists of a bar 244 which carries a rack 246 adapted to engage with a gear segment 248 secured to the shaft 158 as illustrated in Fig. 5. When the control bars 156 are advanced to engage the secondary clutch for the vertical or knee feed the rotation of the shaft 158 will cause the bar 244 to be retracted into the path of the stop cams mounted on the machine column which will act at the desired moment to force the bar 244 forward to disconnect the secondary clutch for the vertical feed.

The several features of the invention have been herein described in connection with a milling machine provided with a work supporting table and a saddle, and a knee on which the saddle and knee are supported to obtain a relative vertical movement of the table and the spindle of the machine. In its broader aspects, however, the invention is not to be limited to this specific organization but is applicable to other types of milling machines in which means other than a knee is provided for obtaining a relative vertical movement between the table and spindle.

One form of the invention as embodied in a milling machine having been described and illustrated, and the advantages to be obtained thereby having been pointed out, what is claimed is:

1. In a milling machine, the combination with a work supporting table, a saddle and knee, of a feed transmission for the table, saddle and knee comprising a main feed shaft, branch transmissions for driving the table, saddle and knee from the main feed shaft, interconnected clutches for throwing the saddle and knee feeds into neutral and alternatively into and out of operation, a variable speed mechanism for driving the shaft, a quick traverse mechanism comprising a two speed clutch for driving the main feed shaft at either of two relatively rapid rates, a controlling lever for the clutch, a cam groove formed in the lever, a lug adapted to engage in the groove, and means controlled by the interconnected clutches for positioning the lug to lock the lever against movement in one direction.

2. In a milling machine, the combination with a work supporting table, saddle and knee, of a feed transmission comprising a main feed shaft, a branch transmission for the table, a branch transmission for the saddle and knee comprising a reversing mechanism for imparting movements in opposite directions to the saddle and knee, secondary clutches for the saddle and knee feeds, manually operated means for controlling the position of the clutches, and a safety latch movable to a position in which it locks the secondary clutches in neutral position and movable to different positions in which it permits the engagement of the secondary clutches for the saddle and knee feeds.

3. In a milling machine, the combination with a work supporting table, saddle and knee of a feed transmission comprising a main feed shaft, a branch transmission for the table, a branch transmission for the saddle and knee comprising a reversing mechanism for imparting movements in opposite directions to the saddle and knee, secondary clutches for the saddle and knee feeds, manually operated means for controlling the position of the secondary clutches, and a safety latch movable to different positions in each of which it permits a movement of a saddle or knee clutch from neutral to engaging position and forms a positive stop to limit the return movement.

4. In a milling machine, the combination with a work supporting table, saddle and knee, of a feed transmission comprising a main feed shaft, a branch transmission for the table, a branch transmission for the saddle and knee comprising a reversing mechanism for imparting movements in opposite directions to the saddle and knee, secondary clutches for the saddle and knee feeds, a connecting bar for the secondary clutches movable axially to operatively connect one or the other of the saddle and knee feeds and to disengage both clutches, a rock shaft at right angles to the connecting bar and operatively connected thereto, recesses formed in the rock shaft, and a safety latch adapted to engage with the recesses to lock the clutches in neutral position and movable to different positions to permit the engagement of the saddle and knee feeds.

5. In a milling machine the combination with a work supporting table, a saddle, and a support cooperating with these parts movable to vary the distance between the spindle and the work supporting table, of a feed transmission for the table, saddle, and support comprising a main feed shaft, branch transmissions for driving the table, saddle, and support from the main feed shaft, interconnected clutches for throwing the feeds for the saddle and support into neutral and alternatively into and out of operation, a variable speed mechanism for driving the shaft, a quick traverse mechanism comprising a two speed clutch for driving the main feed shaft at either of two relatively rapid rates, a controlling lever for the clutch, a cam groove formed in the lever, a lug adapted to engage in the groove, and means controlled by the interconnected clutches for positioning the lug to lock the lever against movement in one direction.

6. In a milling machine the combination with a work supporting table, a saddle, and a support cooperating with these parts adjustable to vary the distance between the spindle and the work supporting table, of a feed transmission comprising a main feed shaft, a branch transmission for the table, a branch transmission for the saddle and support comprising a reversing mechanism for imparting movements in opposite directions to the saddle and support, secondary clutches for the feeds for the saddle and support, manually operated means for controlling the position of the clutches, and a safety latch movable to a position in which it locks the secondary clutches in neutral position and movable to different positions in which it permits the engagement of the secondary clutches for the feeds for the saddle and support.

7. In a milling machine the combination with a work supporting table, a saddle, and a support cooperating with these parts movable to vary the distance between the spindle and the work supporting table, of a feed transmission comprising a main feed shaft, a branch transmission for the table, a branch transmission for the saddle and the support, comprising reversing mechanism for imparting movements in opposite directions to the said saddle and support, secondary clutches for the feeds for the said saddle and support, manually operated means for controlling the position of the secondary clutches, and a safety latch movable to different positions in each of which it permits a movement of either of said secondary clutches from neutral to engaging position, and forms a positive stop to limit the return movement.

8. In a milling machine the combination with a work supporting table, a saddle, and a support cooperating with these parts adjustable to vary the distance between the spindle and the work supporting table, of a feed transmission comprising a main feed shaft, a branch transmission for the table, a branch transmission for the saddle and support comprising a reversing mechanism for imparting movements in opposite directions to the saddle and support, secondary clutches for the feeds for the saddle and support, a connecting bar for the secondary clutches movable axially to operatively connect one or the other of the feeds for the saddle and support and to disengage both clutches, a rock shaft at right angles to the connecting bar and operatively connected thereto, recesses formed in the rock shaft, and a safety latch adapted to engage with the recesses to lock the clutches in neutral position and movable to different positions to permit the engagement of the feeds for the saddle and support.

9. In a milling machine, the combination of a base, a rotatable tool spindle and a work support each supported from said base and relatively bodily movable in a plurality of paths, a power member, a spindle driving train including said member, a rate changer and said spindle in the order mentioned, a transmission for said relative movement including a feed rate element and a quick traverse rate element each driven from said spindle train to exclude said rate changer, a feed train driven from said feed rate element and including an overrunning device, a plurality of branch lines respectively for said relative movement in different of said paths and each including a reverser, each of said branch lines being normally connected with said feed train through said overrunning device, and control mechanism for said transmission including means adapted to selectively connect said quick traverse rate element with said device or to disconnect it therefrom, and means for selective individual operation of said reversers.

10. In a milling machine, the combination of a rotatable tool spindle, a work table, said spindle and table being relatively bodily movable in a plurality of paths, a spindle drive including a power source, and a rate changer, and transmission and control mechanism for said bodily movement including a feed train driven from said power source and a quick traverse train driven from said power source to exclude said rate changer, branch lines respectively for said bodily movement in respective of said paths, overrunning mechanism normally connecting said feed train to actuate a portion of both of said branch lines, means for operating each of said branch lines from said quick traverse train, and a reverser in one of said branch lines individually controlling direction of movement actuated from the last mentioned branch line, said transmission and control mechanism including means operative to effect a different rate of quick traverse movement in the different paths.

11. In a machine tool the combination of a plurality of movable supports, and transmission and control mechanism for movement of said supports including a power source, a feed train driven from said source and including a rate changer, a quick traverse train driven from said source to exclude said rate changer, a plurality of branch lines respectively for movement of the respective supports, overrunning mechanism normally connecting said feed train to drive a portion of both of said branch lines, a plurality of reversers respectively in the respective branch lines, selective means for alternative actuation of each of said branch lines from said quick traverse train, and manually operable devices for the individual operation of each of said reversers and of said selective means.

12. A milling machine including a column, a tool spindle rotatably supported from said column, a knee supported from said column for bodily vertical movement, a work table slidably supported on said knee for movement in a plurality of paths transverse to one another, and transmission mechanism for the movement of said table including a power member rotatably supported on said column, a feed train driven from said member and including a feed element bodily movable with said knee, a quick traverse train driven from said member and including a quick traverse element bodily movable with said knee, a table transmission, overrunning mechanism normally connecting said feed element to actuate said table transmission and bodily movable with said knee, mechanism bodily movable with said knee, and selectively operable to connect and disconnect said quick traverse element to operate said table transmission, said table transmission including branch lines respectively operative for table movement in respective of said paths, one of said branch lines including a reverser bodily movable with said knee and individual to the table movement in the path operative from the last mentioned branch line.

13. In a milling machine, the combination of a rotatable tool spindle, a base supporting said spindle, a work table supported from said base, said spindle and table being relatively bodily movable in a plurality of paths, a spindle train including a power source and a rate changer, transmission mechanism for said bodily movement and driven from said power source to exclude said rate changer and including a feed rate train, a quick traverse rate train, a plurality of branch lines respectively for movement in the respective paths, overrunning mechanism normally connecting said feed train for uni-directional actuation of a portion of both of said branch lines, a plurality of reversers individual to the respective branch lines and adapted to selectively provide either direction of movement in either of said paths in spite of the uni-directional actuation of said branch line portions, means shiftable for connection of said branch lines to be actuated from said quick traverse train, and control mechanism for said transmission including means for individually selectively operating said reversers, and other means for individually operating said quick traverse connecting means, said transmission and control mechanism being adapted to effect said quick traverse at substantially different rates in the respective paths.

14. In a milling machine, the combination of a base, a rotatable tool spindle and a work support each supported from said base and relatively bodily movable in a plurality of paths, a power member, a spindle driving train including said member, a rate changer and said spindle in the order mentioned, a transmission for said relative movement including a feed rate element and a quick traverse rate element each driven from said spindle train to exclude said rate changer, a feed train driven from said feed rate element and including an overrunning device, a plurality of branch lines respectively for said relative movement in different of said paths, including means for reversing the movement in each path, each of said branch lines being normally connected with said feed train through said overrunning device, and control mechanism for said transmission including means adapted to selectively connect said quick traverse rate element with said device or to disconnect it therefrom.

15. In a milling machine, the combination of a base, a rotatable tool spindle and a work support each supported from said base and relatively bodily movable in a plurality of paths, a power member, a spindle driving train including said member, a rate changer and said spindle in the order mentioned, a transmission for said relative movement including a feed rate element and a quick traverse rate element each driven from said spindle train to exclude said rate changer, a feed train driven from said feed rate element and including an overrunning device, a plurality of branch lines respectively for said relative movement in different of said paths, including a plurality of reversers, each of said branch lines being normally connected with said feed train through said overrunning device, and control mechanism for said transmission including means adapted to selectively connect said quick traverse rate element with said device or to disconnect it therefrom, and means for individual operation of said reversers.

16. In a milling machine, the combination of a rotatable tool spindle, a work table, said spindle and table being relatively bodily movable in a plurality of paths, a spindle drive including a power source, and a rate changer, and transmission and control mechanism for said bodily movement including a feed train driven from said power source and a quick traverse train driven from said power source to exclude said rate changer, branch lines respectively for said bodily movement in respective of said paths, mechanism normally connecting said feed train to actuate a portion of both of said branch lines, means for operating each of said branch lines from said quick traverse train, and a reverser in one of said branch lines individually controlling direction of movement actuated from the last mentioned branch line, said transmission and control mechanism including means operative to effect a different rate of quick traverse movement in the different paths.

17. In a milling machine, the combination of a rotatable tool spindle, a work table, said spindle and table being relatively bodily movable in a plurality of paths, a spindle drive including a power source, and a rate changer, and transmission and control mechanism for said bodily movement including a feed train driven from said power source and a quick traverse train driven from said power source to exclude said rate changer, branch lines respectively for said bodily movement in respective of said paths, overrunning mechanism normally connecting said feed train to actuate a portion of both of said branch lines, means for operating each of said branch lines from said quick traverse train, and a reverser in one of said branch lines individually controlling direction of movement actuated from the last mentioned branch line.

18. In a machine tool the combination of a plurality of movable supports, and transmission and control mechanism for movement of said supports including a power source, a feed train driven from said source and including a rate changer, a quick traverse train driven from said source to exclude said rate changer, a plurality of branch lines respectively for movement of the respective supports, overrunning mechanism normally connecting said feed train to drive a portion of both of said branch lines, a plurality of reversers for reversing the movement transmitted through the branch lines, selective means for alternative actuation of each of said branch lines from said quick traverse train, and manually operable devices for the individual operation of each of said reversers and of said selective means.

BENJAMIN P. GRAVES.
ARTHUR F. BENNETT.